United States Patent [19]

Hodak

[11] Patent Number: 5,388,567
[45] Date of Patent: Feb. 14, 1995

[54] SOLAR HEATING PANEL

[76] Inventor: Frank J. Hodak, E. Cruikshank Rd., Valencia, Pa. 16059

[21] Appl. No.: 130,658

[22] Filed: Oct. 1, 1993

Related U.S. Application Data

[63] Continuation-in-part of Ser. No. 970,275, Nov. 2, 1992, abandoned.

[51] Int. Cl.$^6$ .................................................. F24J 2/36
[52] U.S. Cl. ..................................... 126/626; 126/623; 126/651; 126/563
[58] Field of Search ............... 126/563, 624, 625, 626, 126/623, 651; 165/171, 172, 173, 174, 175

[56] References Cited

U.S. PATENT DOCUMENTS

| | | | |
|---|---|---|---|
| 3,022,781 | 2/1962 | Andrassy | 126/624 |
| 3,868,945 | 3/1975 | Konopka et al. | 126/624 X |
| 3,991,742 | 11/1976 | Gerber | 126/426 |
| 4,059,095 | 11/1977 | Grundmann et al. | 126/624 |
| 4,151,830 | 3/1979 | Crombie et al. | 126/624 |
| 4,473,064 | 9/1984 | Jacques | 126/426 |

FOREIGN PATENT DOCUMENTS

| | | | |
|---|---|---|---|
| 2360030 | 7/1976 | France | 126/426 |
| 1525926 | 9/1978 | United Kingdom | 126/426 |

OTHER PUBLICATIONS

WO, 8303661; cl. 126/426, Bengfield, Oct. 1983.

*Primary Examiner*—Carl D. Price
*Attorney, Agent, or Firm*—Webb Ziesenheim Bruening Logsdon Orkin & Hanson

[57] ABSTRACT

A solar heater for a swimming pool or the like is formed by heat sealing two rectangular sheets of a flexible thermoplastic material, such as black vinyl, around the peripheral edges thereof. A plurality of spaced apart heat sealed seams are formed between the two sheets. The seams have end portions alternately spaced from and joined to the sealed peripheral edge to define a plurality of passageways forming a serpentine water pathway through the collector. Inlet and outlet fittings communicate with the passageways to permit pool water to circulate in the collector to be heated therein.

8 Claims, 4 Drawing Sheets

SOLAR HEATING PANEL

CROSS-REFERENCE TO RELATED APPLICATION

This is a continuation-in-part application of application U.S. Ser. No. 07/970,272, filed Nov. 2, 1992, now abandoned.

BACKGROUND OF THE INVENTION

The present invention relates to solar collectors or solar heaters for heating water. More particularly, my invention relates to a portable solar collector which is particularly suitable for heating water for swimming pools.

Heretofore, it has been a rather expensive undertaking to heat water for a swimming pool, not only in the cost of the heater and the accompanying installation, but also in the fuel costs required. Such conventional gas fired pool heaters are quite inefficient in heating the pool water, with much of the unused heat escaping to the air with the exhaust gases. Needless to say, the cost and efficiency of conventional pool heaters can be improved.

My invention solves the problems and expense found in conventional pool heaters by providing a heater which is far less expensive than conventional natural gas fired pool heaters, far less expensive to install, and requires no combustible fuel to heat the water. My invention, in addition to the obvious cost savings over conventional heaters, is also environmentally friendly since no harmful waste gases are generated in the heating process as is the case in conventional natural gas heaters which emit carbon dioxide and unburned hydrocarbon pollutants. The present invention provides a water heater which is lightweight, portable, relatively inexpensive and easily installed as a heater for swimming pools or for other applications where heated water is desired.

SUMMARY OF THE INVENTION

Briefly stated, my invention is directed to a relatively inexpensive, portable solar heater for a swimming pool comprising a pair of overlayed sheets of flexible polymeric material, preferably black polyvinylchloride (PVC), which are heat sealed around the peripheral edges thereof. The joined PVC sheet in plan view is on the order of about four to six feet wide by about twenty feet long. The opposed sheets define an open interior which is divided into a plurality of water channels by way of a plurality of transversely extending heat sealed seams extending from one long edge of the collector toward the other. The heat sealed seams may be about six inches apart. Alternate heat sealed seams terminate a distance from one or the other edges so that all adjacent water channels so formed communicate with each other. A fastener and washer assembly is placed at the end of each heat sealed seam to provide additional strength and prevent tearing of the seams due to high water pressure and turbulence. The water channels define a generally serpentine water pathway extending from a first end of the solar collector to a second end of the collector. A water inlet fitting is attached to the first end of the collector in communication with the water channel to permit the introduction of water to be heated into the collector. One or more outlet fittings are attached to the second end of the collector in communication with the water channel to permit heated water to exit the collector.

In use, the solar collector is placed in a sunny area and water from the pump/filtration unit is introducted at the inlet fitting. The pool water circulates through the collector along the serpentine pathway defined by the water channels. Solar energy is radiantly absorbed by the black vinyl material and conducted to the circulating water. The heated water exits the collector at the outlet fitting and is returned to the pool by way of an appropriate conduit.

In a further embodiment, the solar collector of the invention can operate passively as a thermal pump without the aid of a motor driven pump. In such a modified arrangement, the water from the pool is directed to the collector, heated therein and delivered to the return port of the pool. The heating action of the solar collector thermally pumps the water from the cooler to the hotter location without the aid of an external mechanical pump.

DETAILED DESCRIPTION OF THE INVENTION

Figure 1:
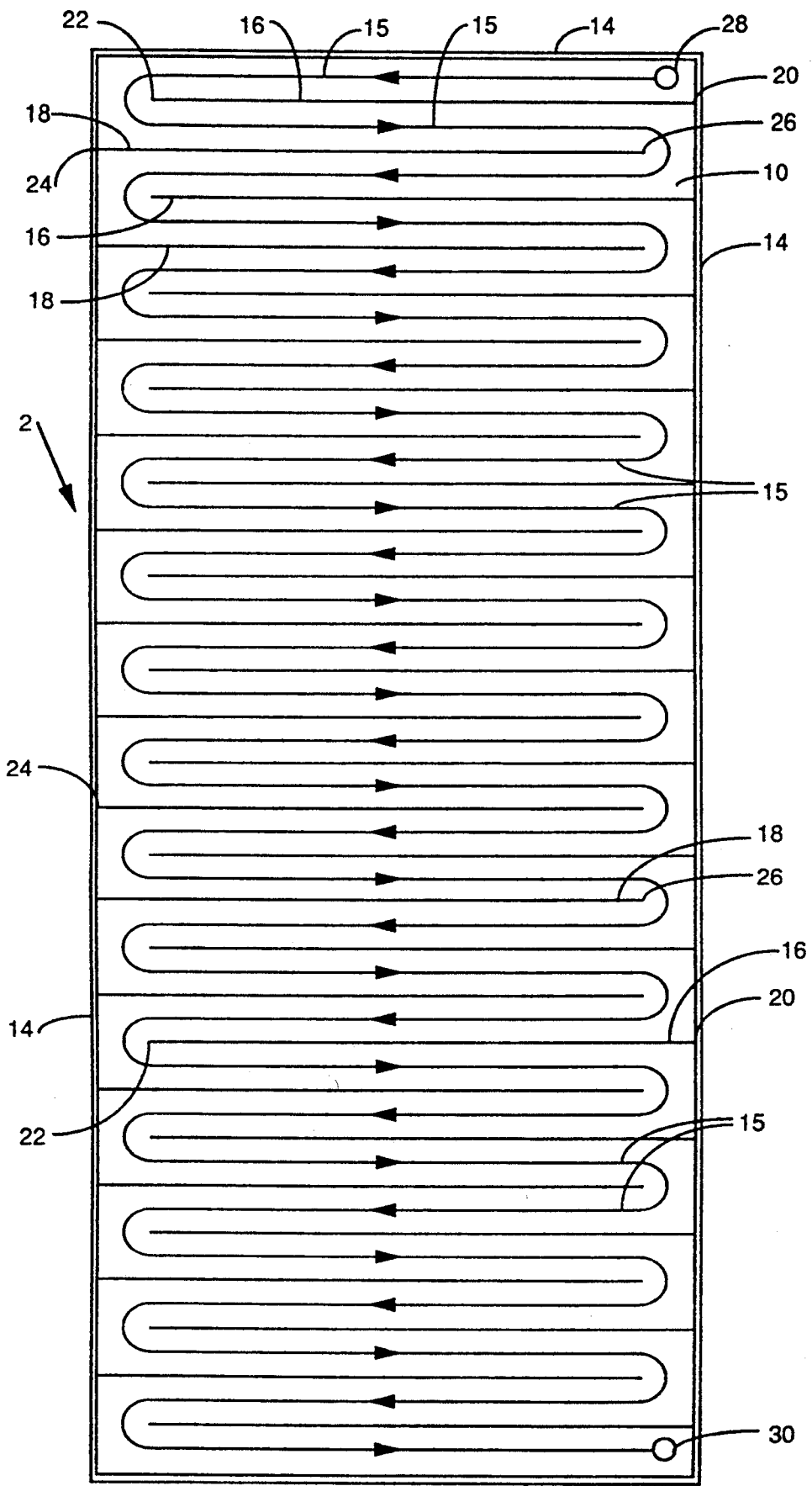
FIG. 1 is a plan view of a solar collector constructed according to the present invention.
Figure 2:
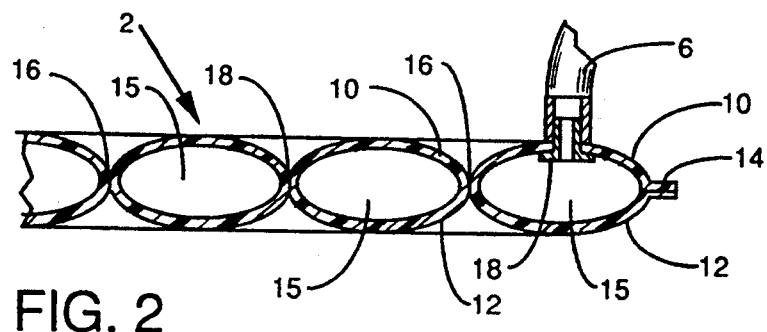
FIG. 2 is a partial cross sectional side view of the solar collector of FIG. 1.

With reference now to the drawings and, particularly, to FIGS. 1 and 2, the solar heating panel or collector of the invention is identified therein by reference numeral 2. The solar collector 2 is formed from two sheets of thin flexible thermoplastic material. A vinyl sheet of 20 to 30 mils thickness is suitable. The heavier, 30 mil thickness is preferred for strength purposes and in order to resist tearing due to high water pressures. Preferably, the plastic material is black in color to increase the heat absorption properties of the collector 2. A first, upper plastic sheet 10 of a generally rectangular shape is joined around its periphery to a second, lower plastic sheet 12 of like size by known heat or solvent sealing techniques to form a joint 14 around the periphery thereof.

A plurality of spaced-apart transverse heat sealed seams 16 and 18 are formed to join the upper and lower sheets 10 and 12, respectively. The transverse seams 16 and 18 form a plurality of water passages 15 in the open interior between the upper and lower sheets 10 and 12. A first end 20 of transverse seam 16 is located at the sealed edge 14 and a second edge 22 of seam 16 is spaced from the edge 14 to provide communication at one end between an adjacent pair of passageways 15. A first end 24 of seam 18 is located at the sealed edge 14 and a second end 26 of the seam 18 is spaced from the edge 14 to permit communication with the next adjacent passageway 15. In this manner, the alternate heat sealed transverse seams 16 and 18 are formed to create a serpentine-like water pathway through the width and length of the solar collector 2.

Figure 5:
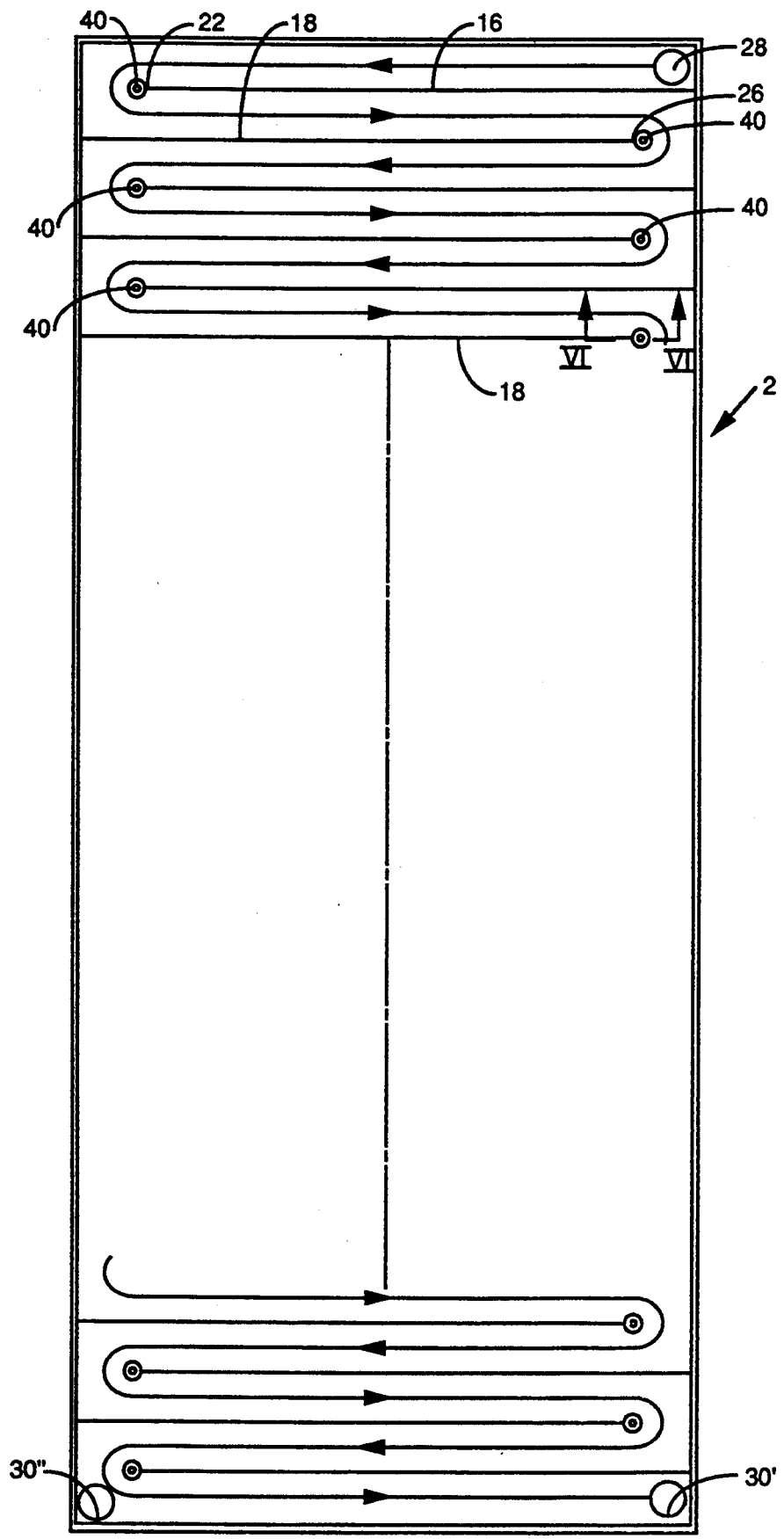
FIG. 5 is a plan view similar to FIG. 1 showing the fastener and washer assemblies.
Figure 6:
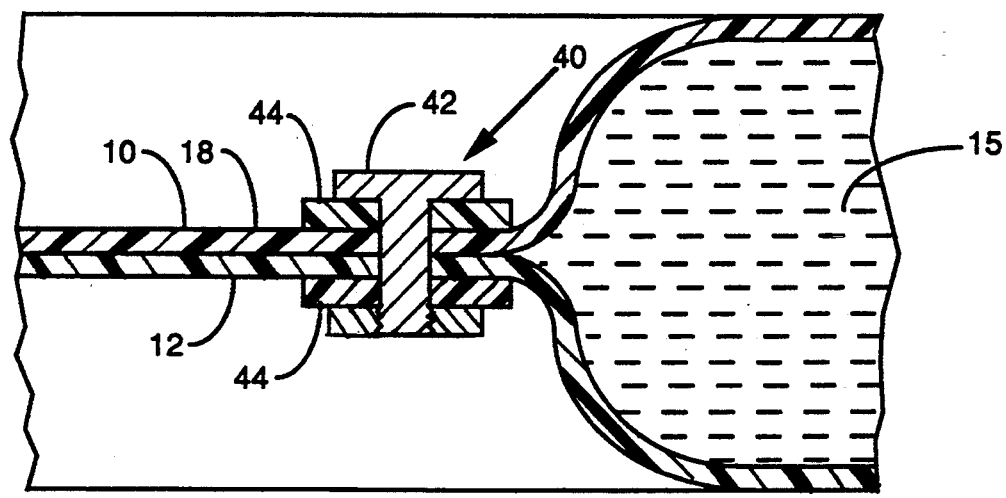
FIG. 6 is a cross sectional side view of a fastener and washer assembly taken along line VI—VI of FIG. 5.

The heat sealed seams 16 and 18 are preferably about ½ inch in width to provide adequate strength. As seen in FIGS. 5 and 6, a washer assembly 40 is positioned at ends 22 and 26 of the heat sealed seams 16 and 18, respectively. The assembly 40 includes a conventional fastener which may be a rivet and a pair of one inch diameter washers 44 positioned above and below the respective upper and lower sheets 10 and 12. A conventional nut and bolt 42 can be used in place of the rivet to fasten the one inch washers 44 in place. If a nut and bolt are used, it is preferable to employ a ¼ inch, 20 thread bolt with a nylon insert lock nut. With the washer assembly 40 securely in place, deseaming and blowout of the heat sealed seams 16 and 18 are prevented at high water pressures. Typically, the water pressure and turbulence developed by a swimming pool pump will tear apart conventional heat sealed seams at their end points, hence, the washer assemblies 40 solve this problem. In addition, the more expensive fabric reinforced plastic sheets and/or stronger and more expensive plastic materials are not necessary due to the use of the heavier 30 mil vinyl material and fastener/washer construction.

A water inlet fitting 28 communicates with the first of the passageways 15 and outlet fitting 30 communicates with the last of the passageways. The fittings 28 and 30 are also plastic and preferably are heat or solvent sealed to the upper sheet 10 within an appropriate hole formed therein. The fittings 28 and 30 are preferably 1½ inches in diameter to mate with standard pool conduits, such as the inlet and outlet conduits 6 and 8, respectively. In FIG. 5, two outlet fittings 30' and 30" are provided to insure adequate pressure relief and prevent tearing and/or deseaming of the vinyl material.

By way of example, the solar collector 2 may be twenty feet long and four to six feet wide, with the transverse seams 16 and 18 formed at six inch spacings. Such a configured and sized solar collector 2 contains a continuous water pathway of about 140 to 240 feet, with an active solar heating surface area of about 80 to 120 square feet, depending upon the width selected. The sheet construction renders the collector flexible, lightweight and transportable. Easy installation and dismantlement are achieved with no special tools or expertise required.

Figure 3:
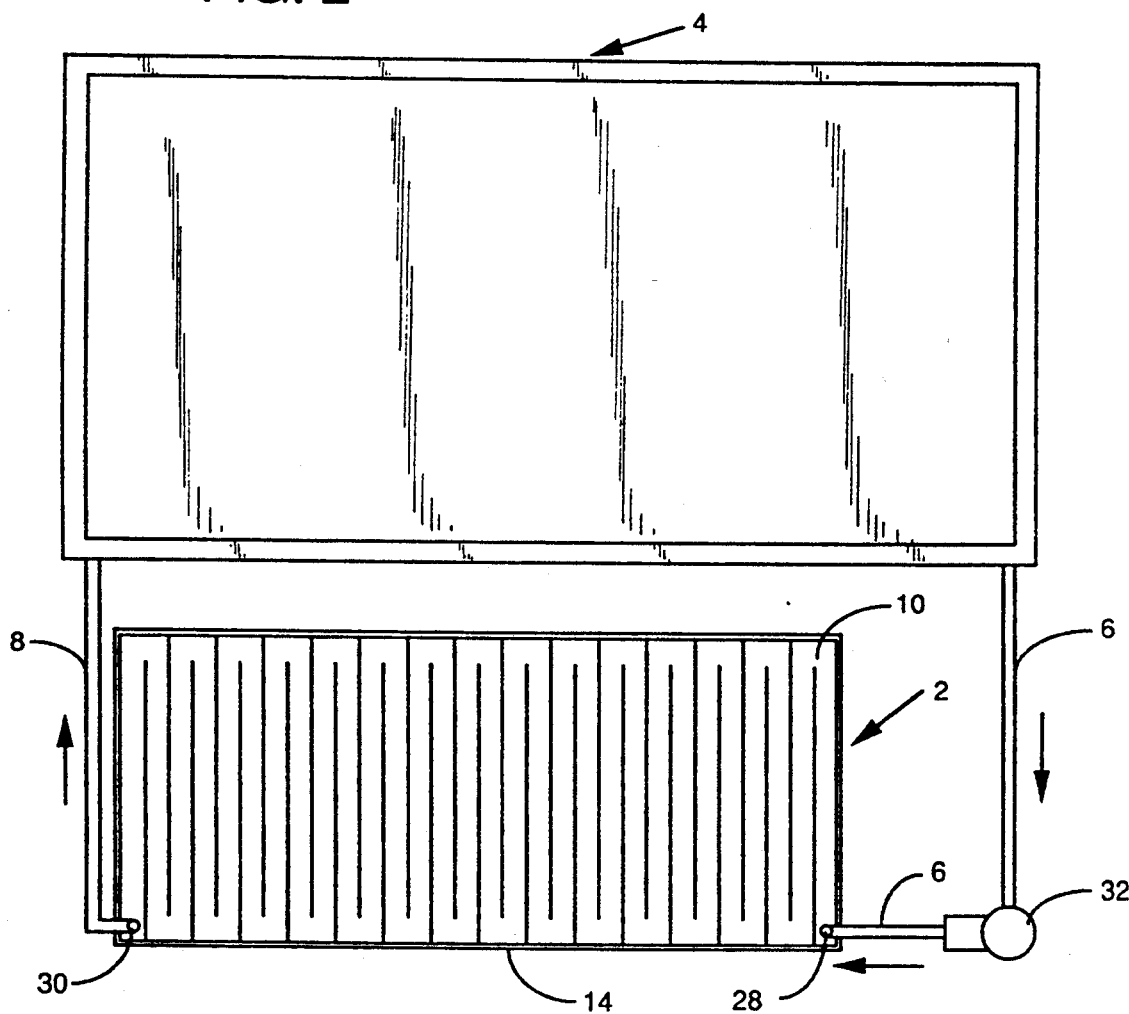
FIG. 3 is a schematic plan view showing the invention in use with a typical swimming pool.
Figure 4:
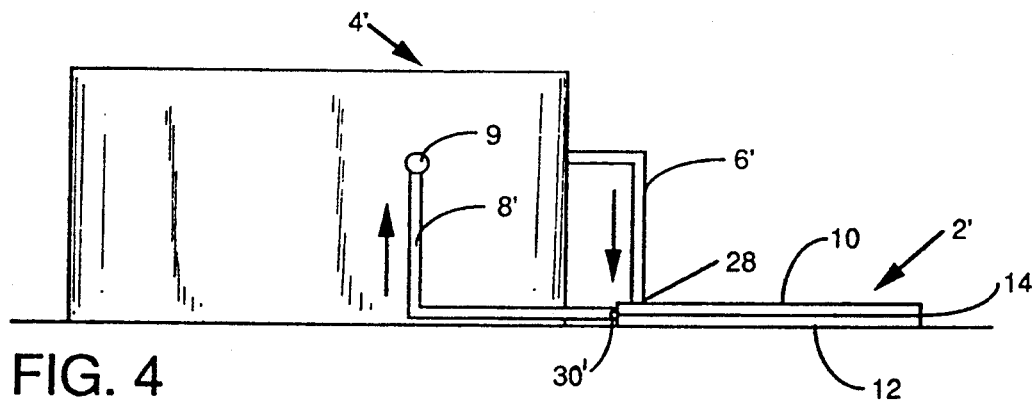
FIG. 4 is a side view of the invention similar to FIG. 3 except no pump is employed.

FIGS. 3 and 4 show the solar collector 2 in use with a conventional swimming pool 4. Water is removed from the pool by way of the conduit 6 and introduced to the solar heating panel 2 at inlet fitting 28. The water flows through the serpentine pathway defined by the interconnected passageways 15 from the inlet fitting 28 to the outlet fitting 30. Radiant thermal energy carried by the sunlight is absorbed by the upper plastic sheet 10 and is thermally conducted to the flowing water in a very efficient manner.

The schematic arrangement depicted in FIG. 3 shows a typical installation wherein the solar collector 2 of the invention is used with a conventional swimming pool pump and filter apparatus 32 for circulating the water therethrough, heating the water in solar collector 2 and returning heated water from the collector 2 to the pool 4 via conduit 8.

FIG. 4 shows the solar collector 2' of the invention connected to an above-ground pool 4' by way of an outlet conduit 6' and a return conduit 8'. In the alternate scheme of FIG. 4, no pump is employed. The solar collector 2' heats the pool water and acts as a passive thermal pump to circulate the heated water through conduit 8' to the pool 4' even though the inlet 9 is at a higher elevation than the collector 2'. Thus, the pool water in swimming pool 4' may be heated passively, without the need for an electric pump or a gas fired heater. The savings in utility costs over conventional pool heating is not insubstantial.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A solar heater adapted to heat water for a swimming pool comprising a collector including an upper sheet of unreinforced plastic material and a lower sheet of unreinforced plastic material joined around a peripheral edge thereof, said collector including a plurality of spaced apart heat sealed seams joining said upper and lower sheets having end points alternately spaced from and joined to said sealed peripheral edge to define a plurality of passageways forming a serpentine water pathway through said collector, said collector including a fastener and washer assembly positioned at said end points of the heat sealed seams, said collector also having an inlet fitting at a first of said passageways and at least one outlet fitting at a last of said passageways, whereby in use water is introduced at said inlet fitting and heated from thermal energy absorbed by said collector to be withdrawn at the outlet fitting as solarly heated water.

2. The solar heater of claim 1 wherein at least said upper sheet of flexible plastic is of a dark color.

3. The solar heater of claim 2 wherein the color of the flexible plastic is black.

4. The solar heater of claim 1 wherein at least the plastic is a vinyl material having a thickness of about 30 mils.

5. The solar heater of claim 1 wherein the collector is about twenty feet in length and about four to six feet wide with the heat sealed seams spaced about six inches apart.

6. A solar heater adapted to heat water for a swimming pool comprising a self supporting collector including rectangularly shaped upper and lower sheets of a vinyl plastic material of a dark color and having a thickness of about 30 mils sealed around a peripheral edge thereof, said collector including a plurality of spaced apart, transversely extending heat sealed seams joining said upper and lower sheets having end points alternately spaced from said sealed peripheral edge to define a plurality of transverse water passageways forming a continuous serpentine water pathway through the collector, said collector including a fastener and washer assembly secured at each end point of the heat sealed seams, said collector also having an inlet and two outlet fitting means communicating with said passageways to permit water to be introduced to said collector and heated water to be withdrawn therefrom.

7. The solar heater of claim 6 wherein the vinyl plastic material is black in color.

8. The solar heater of claim 6 wherein the rectangular collector is about twenty feet in length and six feet wide and wherein the transverse heat seal seams defining the water passageways are spaced apart about six inches.

* * * * *

UNITED STATES PATENT AND TRADEMARK OFFICE
CERTIFICATE OF CORRECTION

PATENT NO. : 5,388,567
DATED      : February 14, 1995
INVENTOR   : Frank J. Hodak It is certified that error appears in the above-indentified patent and that said Letters Patent is hereby corrected as shown below:

Title page, under [56] References Cited, FOREIGN PATENT DOCUMENTS, "2360030 7/1976 France ... 126/426" should read --2360050 7/1976 France ... 126/426--.

Column 1 Line 7 "07/970,272" should read --07/970,275--.

Signed and Sealed this

Twenty-fifth Day of April, 1995

Attest:

BRUCE LEHMAN

Attesting Officer

Commissioner of Patents and Trademarks